(12) United States Patent
Gu (10) Patent No.: US 12,384,478 B1
(45) Date of Patent: Aug. 12, 2025

(54) VERTICAL BICYCLE STAND

(71) Applicant: Haidong Gu, Montclair, CA (US)

(72) Inventor: Haidong Gu, Montclair, CA (US)

(73) Assignee: CYCLINGDEAL USA, INC., CA (US)

( * ) Notice: Subject to any disclaimer, the term of this patent is extended or adjusted under 35 U.S.C. 154(b) by 0 days.

(21) Appl. No.: 18/760,038

(22) Filed: Jul. 1, 2024

(51) Int. Cl.
*B62H 3/12* (2006.01)

(52) U.S. Cl.
CPC ..................... *B62H 3/12* (2013.01)

(58) Field of Classification Search
CPC .... B62H 3/12; B62H 3/06; B62H 3/08; A47F 5/06; A47F 5/04
See application file for complete search history.

(56) References Cited

U.S. PATENT DOCUMENTS

| | | | | |
|---|---|---|---|---|
| 5,244,133 A * | 9/1993 | Abbott | ............ | B60R 9/10 |
| | | | | 224/532 |
| 5,447,241 A * | 9/1995 | Bureau | ............ | B62H 3/02 |
| | | | | 211/5 |
| 5,690,260 A * | 11/1997 | Aikins | ............ | B60R 9/10 |
| | | | | 224/532 |
| 6,679,388 B1 * | 1/2004 | Chiu | ............ | B62H 3/12 |
| | | | | 248/170 |
| 10,501,023 B1 * | 12/2019 | Mayers | ............ | B60R 9/10 |
| 11,046,380 B1 * | 6/2021 | Gu | ............ | B62H 3/12 |
| 11,312,438 B1 * | 4/2022 | Gu | ............ | B62H 3/08 |
| 11,505,267 B1 * | 11/2022 | Gu | ............ | B62H 3/04 |
| 11,851,124 B1 * | 12/2023 | Ricketts | ............ | B62H 3/02 |
| 11,964,721 B1 * | 4/2024 | Liu | ............ | B62H 3/10 |

* cited by examiner

*Primary Examiner* — Ko H Chan (57) ABSTRACT

A vertical bicycle stand includes a vertical pole assembly having a first hanging position and a second hanging position connected to two ends thereof. A first hanging assembly for hanging a bicycle front wheel is connected to the first hanging position of the vertical pole assembly. The first hanging assembly is rotatably attached to any radial position of the vertical pole assembly. A second hanging assembly for hanging a bicycle rear wheel is connected to the second hanging position of the vertical pole assembly. The second hanging assembly is rotatably attached to any radial position of the vertical pole assembly. A foot assembly is connected to a lower end of the vertical pole assembly.

8 Claims, 8 Drawing Sheets

VERTICAL BICYCLE STAND

FIELD OF THE INVENTION

The present invention relates to a bicycle stand, particularly to a vertical bicycle stand that allows a bicycle to be hung upright.

BACKGROUND OF THE INVENTION

Bicycles on the market are generally large in size, making them difficult to display without overcrowding. For aesthetic reasons and to prevent damage to the bicycle frame, kickstands are usually not installed. Instead, bicycles are either leaned against a wall or laid flat on the ground. However, these methods can easily lead to scratches on the bicycle frame. To address this issue, vertical parking racks have been introduced. Most vertical parking racks have a hook at the top of the main pole to hang the bicycle wheel, allowing the bicycle to stand upright with the wheels facing up and the rear wheel down. Nevertheless, this method has several drawbacks. The primary issue is that the vertical parking rack relies solely on the hook at the top of the main pole to hang the wheel. As a result, the bicycle can sway or even fall if touched. In other words, the existing bicycle parking racks still have many deficiencies that need improvement.

The present invention intends to provide a vertical bicycle stand to overcome the aforementioned shortcomings of the prior art and to allow users to adjust the orientation of the bicycle according to different site conditions when hanging and displaying it.

SUMMARY OF THE INVENTION

The present invention relates to a vertical bicycle stand and comprises a vertical pole assembly having a first hanging position at a top thereof, and a second hanging position at a bottom of the vertical pole assembly. At least one first hanging assembly used to hang a bicycle front wheel is connected to the first hanging position of the vertical pole assembly. The at least one first hanging assembly is rotatably attached to any radial position of the vertical pole assembly. At least one second hanging assembly used to hang a bicycle rear wheel is connected to the second hanging position of the vertical pole assembly. The at least one second hanging assembly is rotatably attached to any radial position of the vertical pole assembly. A foot assembly is connected to a lower end of the vertical pole assembly.

The main objective of the present invention is to overcome the aforementioned shortcomings of the prior art and to provide a vertical bicycle stand that allows users to adjust the orientation of the bicycle according to different site conditions when hanging and displaying it.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 4:
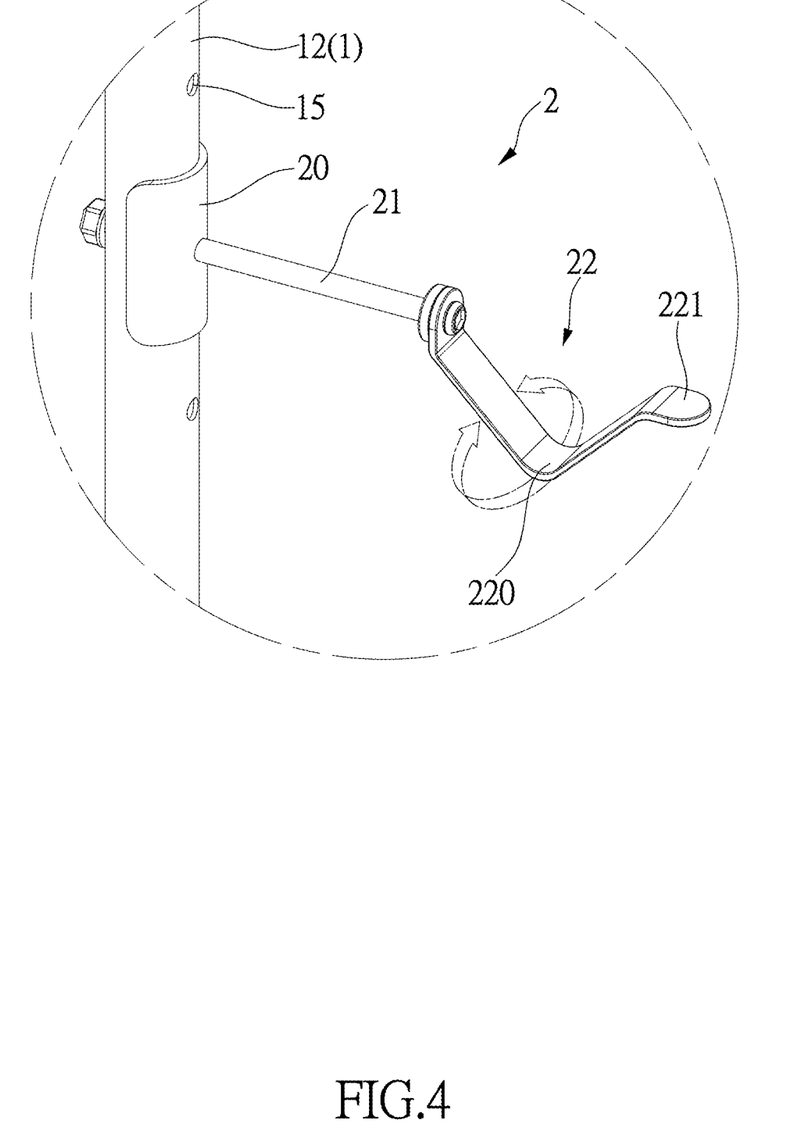
FIG. 4 is a partially enlarged view of the first hanging assembly of the present invention.
Figure 5:
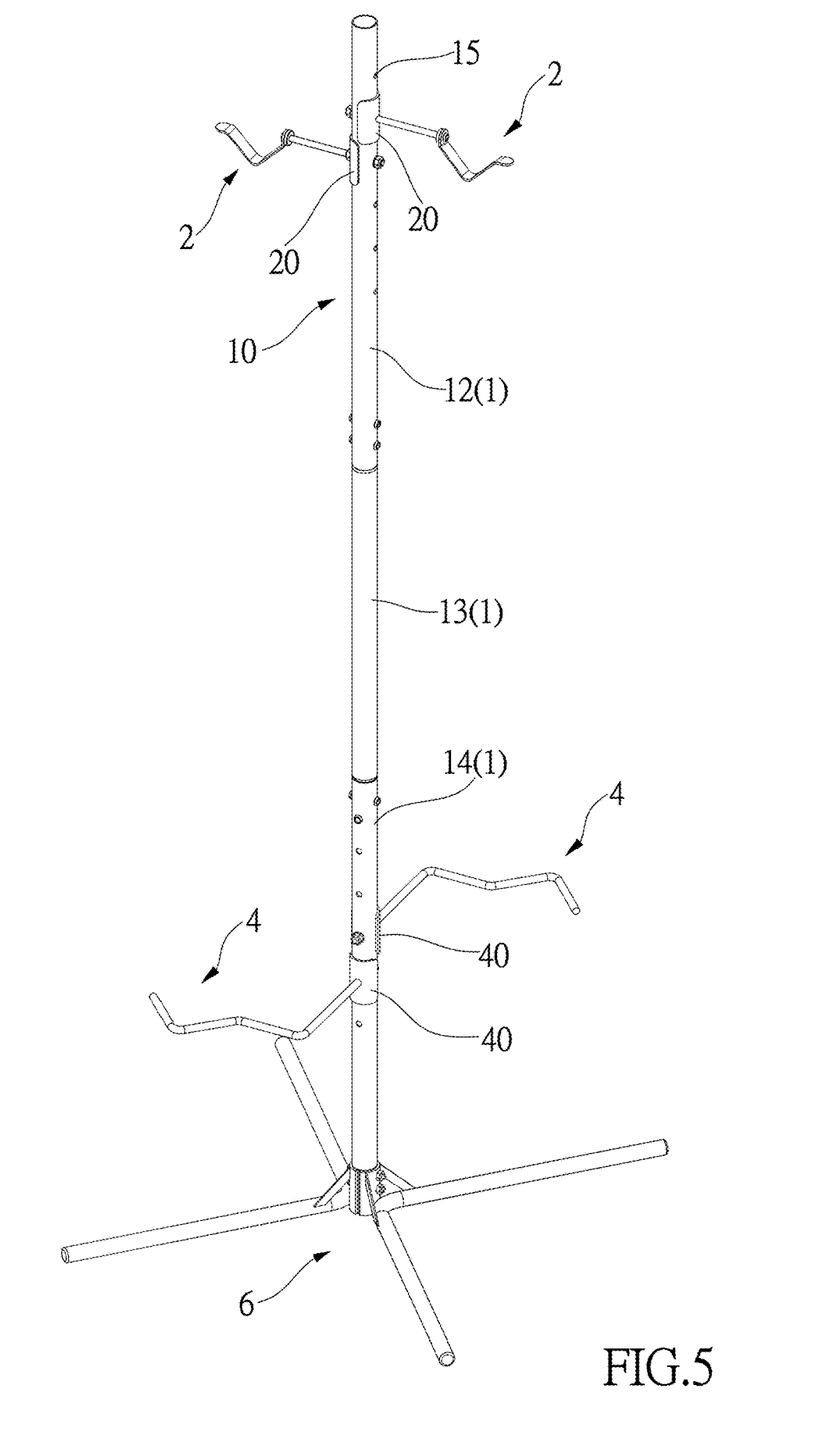
FIG. 5 is a perspective view showing the first and second hanging assemblies rotated and attached to another position of the vertical pole assembly in the present invention.

Referring to FIG. 4, the vertical bicycle stand comprises a vertical pole assembly (1) having a first hanging position (10) at a top thereof, and a second hanging position (11) at a bottom of the vertical pole assembly (1). the vertical pole assembly (1) comprises an upper tube (12), a middle tube (13), and a lower tube (14), the middle tube (13) has a connecting section (130) formed on each of two ends thereof, the upper tube (12) and the lower tube (14) are respectively connected to the two connecting sections (130), a length of the vertical pole assembly (1) is adjustable by being connected with the middle tube (13) of different lengths.

At least one first hanging assembly (2) which is used to hang a bicycle front wheel and is connected to the first hanging position (10) of the vertical pole assembly (1). The at least one first hanging assembly (2) is rotatably attached to any radial position of the vertical pole assembly (1). Specifically, the at least one first hanging assembly (2) includes a first plate (20), a first link (21) connected to the first plate (20), and a first part (22) connected to the first link (21). The vertical pole assembly (1) has a plurality of first connecting holes (15), and the first plate (20) has a first connecting part (23). A first connector (3) is connected to the first connecting part (23) extending through the first connecting hole (15).

At least one second hanging assembly (4) is used to hang a bicycle rear wheel and is connected to the second hanging position (11) of the vertical pole assembly (1). The at least one second hanging assembly (4) is rotatably attached to any radial position of the vertical pole assembly (1). The at least one second hanging assembly (4) includes a second plate (40), a second link (41) connected to the second plate (40), and a second part (42) connected to the second link (41). The vertical pole assembly (1) has a plurality of second connecting holes (16), and the second plate (40) has a second connecting part (43). A second connector (5) is connected to the second connecting part (43) extending through the second connecting hole (16).

Figure 1:
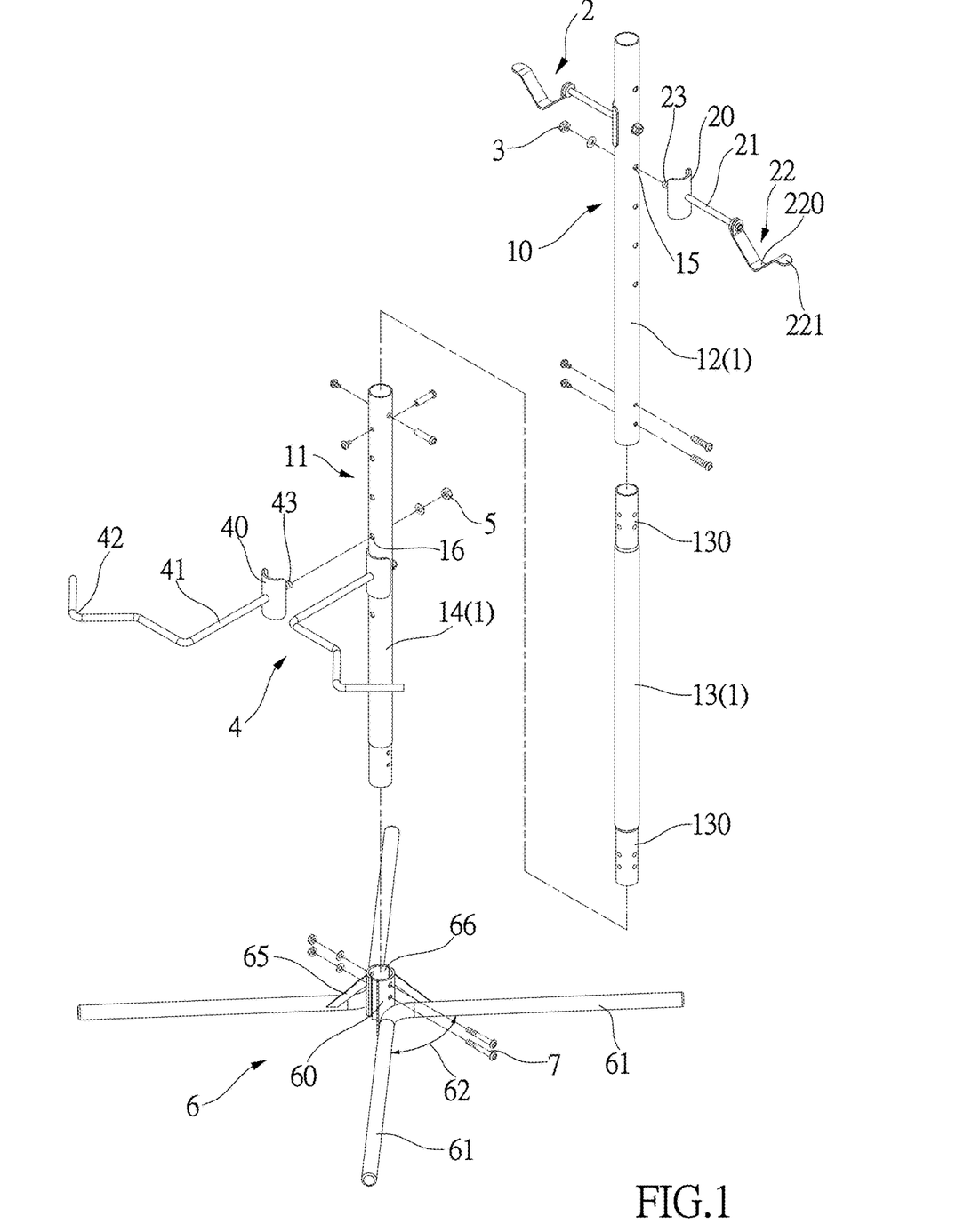
FIG. 1 is an exploded view of the present invention.
Figure 2:
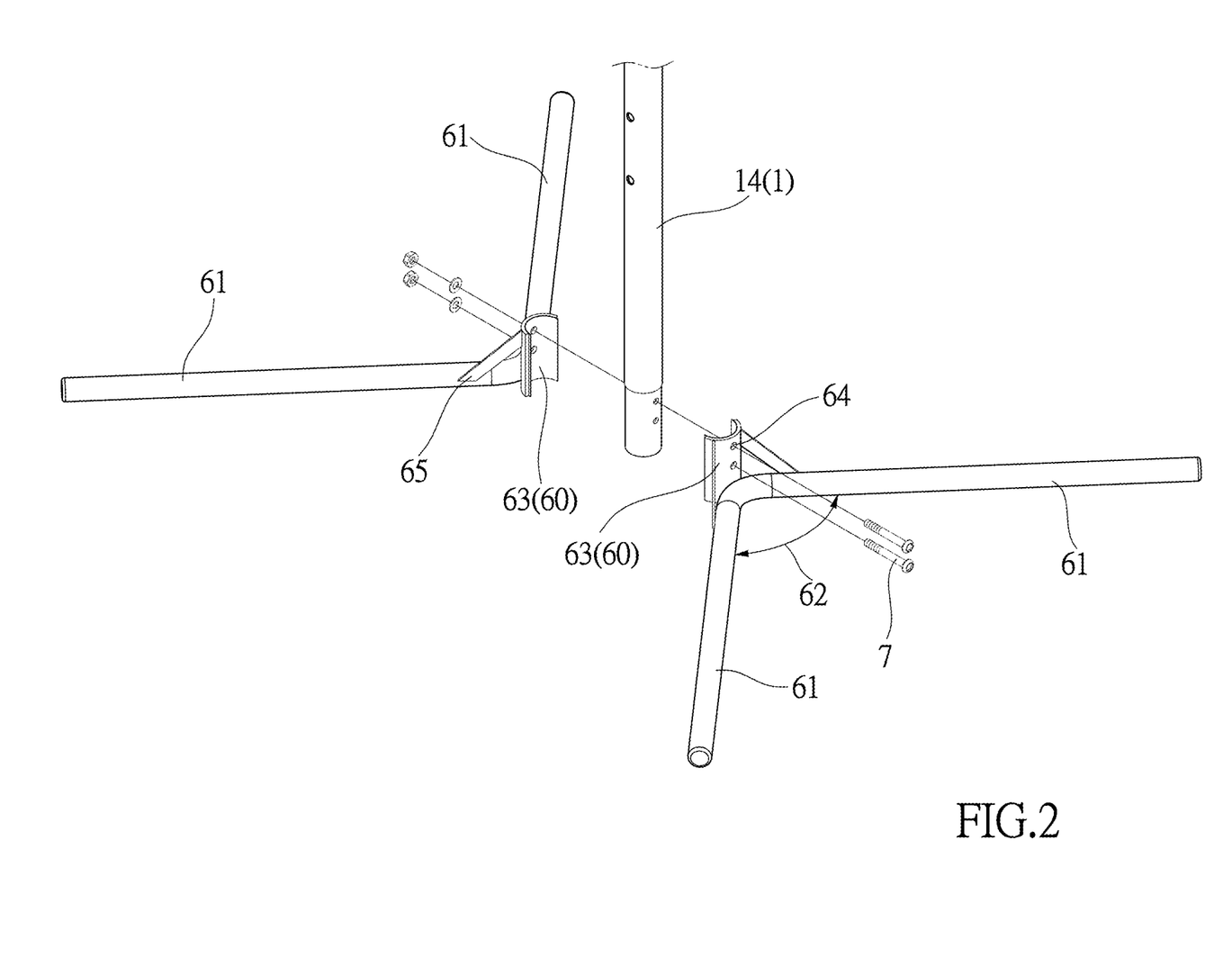
FIG. 2 is an exploded view of the foot assembly of the present invention.
Figure 3:
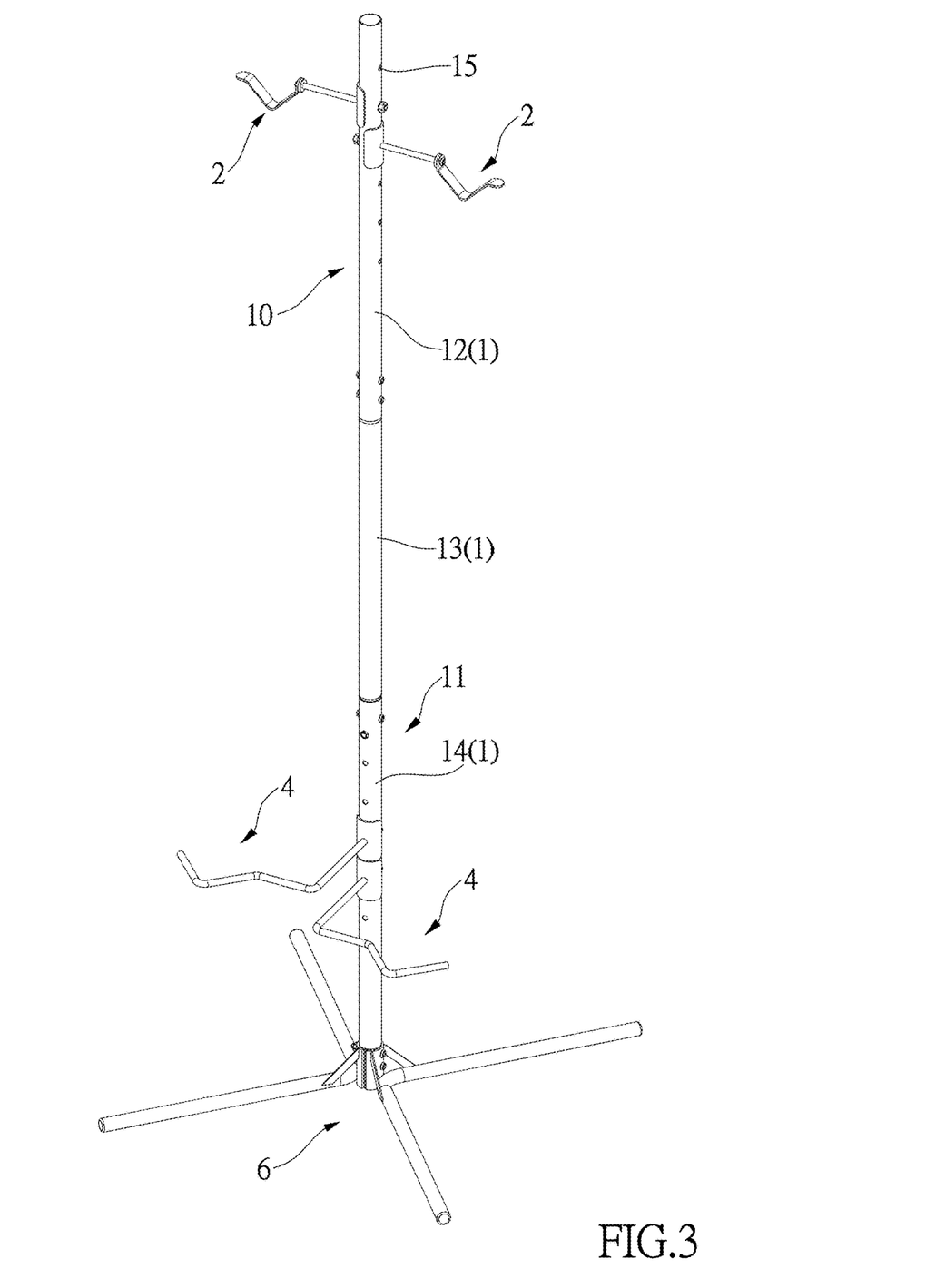
FIG. 3 is a perspective view of the present invention.

A foot assembly (6) is connected to a lower end of the vertical pole assembly (1). The foot assembly (6) includes a sleeve assembly (60) and a plurality of support rods (61) connected to an outer surface of the sleeve assembly (60). An angled area (62) is formed between any two adjacent support rods (61). The sleeve assembly (60) is consists of two arc-shaped pieces (63), and the two arc-shaped pieces (63) have a plurality of third connecting holes (64). A plurality of third connectors (7) extend through the third connecting holes (64) of the two arc-shaped pieces (63) and are connected with nuts to secure the sleeve assembly (60). The sleeve assembly (60) has a plurality of reinforcing parts (65) that are connected to the support rods (61). The sleeve assembly (60) has a passage (66) into which the vertical pole assembly (1) is inserted. The arrangement of the sleeve assembly (60), the support rods (61) and the reinforcing parts (65) stabilizes a standing position of the vertical pole assembly (1).

Figure 6:
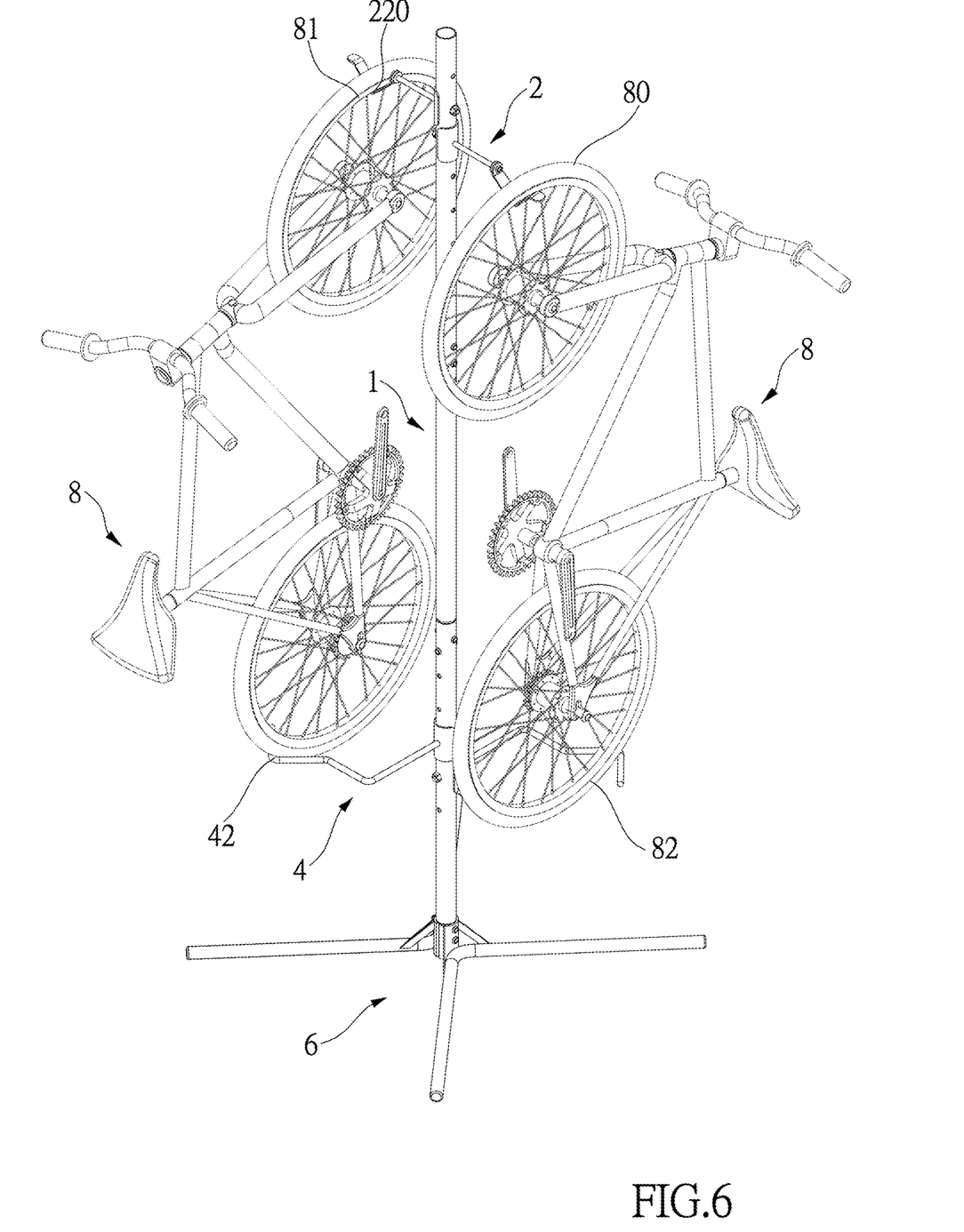
FIG. 6 is a schematic view to show that two bicycles are positioned upright in the vertical bicycle stand of the present invention.
Figure 7:
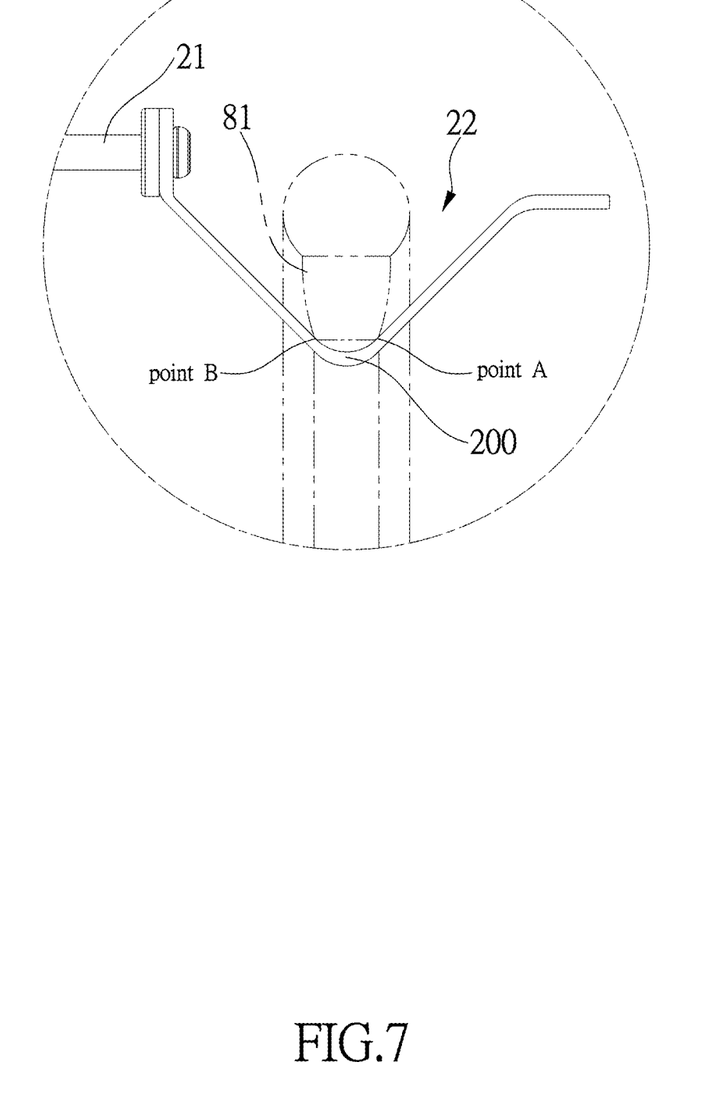
FIG. 7 shows that the front wheel of a bicycle resting against points A and B on the first curved portion in the present invention.
Figure 8:
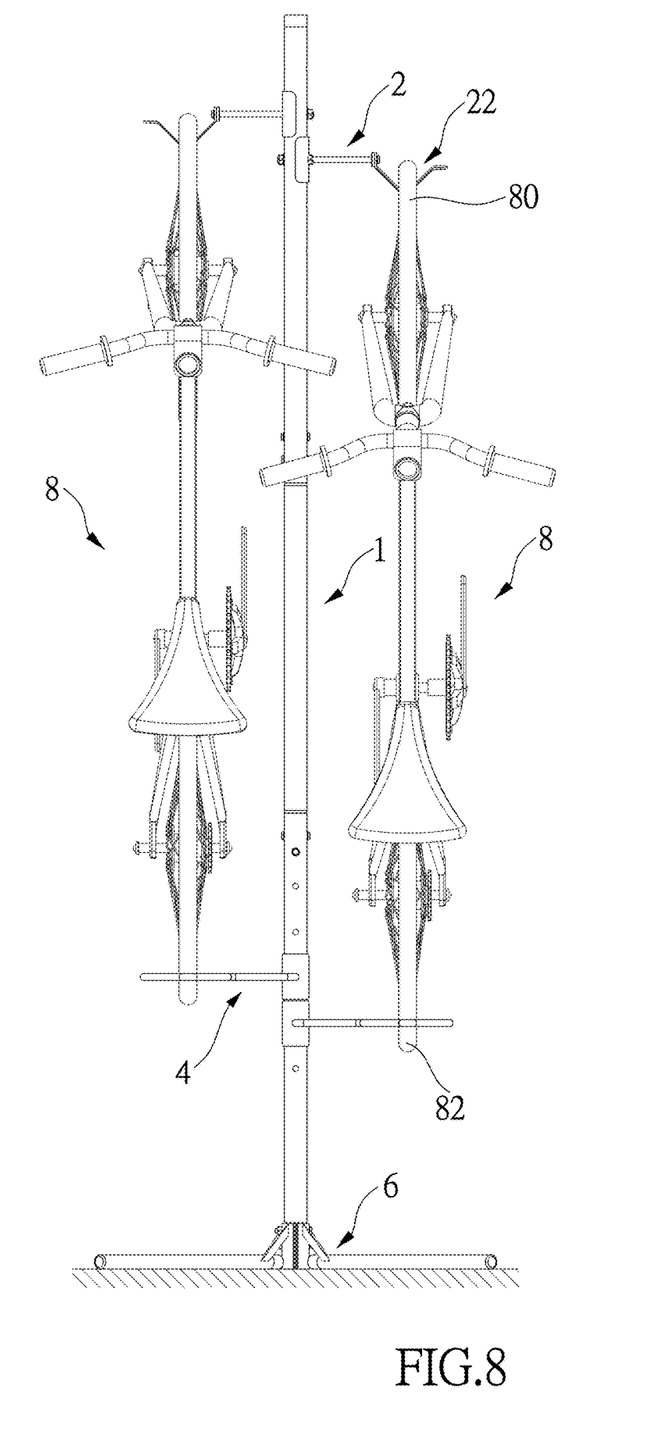
FIG. 8 shows another embodiment of two bicycles hanging upright in the present invention.

As shown in FIGS. 6 to 8, the vertical bicycle stand of the present invention is primarily used for displaying bicycles by hanging them. When the user lifts the front wheel (80) of the bicycle (8) to hang it on the first hanging assembly (2), he or she may not lift it high enough or at the correct angle, causing the front wheel (80) to hit the first part (22). In this situation, the user can rotate the first part (22) (as shown in FIG. 4) to allow the front wheel (80) to be successfully hung on the first hanging assembly (2). The rim (81) of the front wheel (80) is hung on the first curved portion (220) of the first hanging assembly (2). During this hanging process, the arc section (221) of the first part (22) prevents the rim (81) from colliding with sharp objects and getting damaged (as shown in FIG. 4). Then, the user hangs the rear wheel (82) of the bicycle (8) on the second part (42) of the second hanging assembly (4).

When the user hangs the rim (81) of the front wheel (80) on the first curved portion (220) of the first hanging assembly (2), with both sides of the rim (81) resting against points "A" and "B" on the first curved portion (220) (as shown in FIG. 7), and hangs the rear wheel (82) on the second part (42) of the second hanging assembly (4). The bicycle (8) is supported by the first and second hanging assemblies (2, 4), positioned near the top and bottom of the vertical pole assembly (1), respectively. This setup prevents the bicycle (8) from swinging excessively due to external forces during the entire hanging process.

Furthermore, to ensure that the vertical pole assembly (1) is stably supported on the ground, each support rod (61) of the foot assembly (6) is connected at one end to the outer surface of the sleeve assembly (60). The angled area (62) is formed between two adjacent support rods (61). The sleeve assembly (60) has a passage (66) formed in a top thereof that accommodates the vertical pole assembly (1). After the vertical pole assembly (1) is inserted into the passage (66), the setup of the sleeve assembly (60), the support rods (61), and the multiple reinforcing parts (65) ensures the stable standing of the vertical pole assembly (1).

Accordingly, the novel vertical bicycle stand of the present invention provides a way to hang bicycles. The hanging method primarily involves the first hanging assembly (2) supporting the rim (81) of the front wheel (80), and the second part (42) supporting the rear wheel (82). The first and second hanging assemblies (2, 4) can be rotatably attached to any radial position of the vertical pole assembly (1), allowing the user to change the orientation of the bicycle (8) according to the site conditions and environmental factors (as shown in FIGS. 6 and 8).

While we have shown and described the embodiment in accordance with the present invention, it should be clear to those skilled in the art that further embodiments may be made without departing from the scope of the present invention.

What is claimed is:

1. A vertical bicycle stand, comprising:
   a vertical pole assembly (1) having a first hanging position (10) at a top thereof, and a second hanging position (11) at a bottom thereof;
   at least one first hanging assembly (2) which is adapted to hang a bicycle front wheel and is connected to the first hanging position (10) of the vertical pole assembly (1), the at least one first hanging assembly (2) being rotatably attached to any radial position of the vertical pole assembly (1), the at least one first hanging assembly (2) including a first plate (20), a first link (21) connected to the first plate (20), and a first part (22) connected to the first link (21), the vertical pole assembly (1) having a plurality of first connecting holes (15), the first plate (20) having a first connecting part (23), a first connector (3) connected to the first connecting part (23) extending through the first connecting hole (15);
   at least one second hanging assembly (4) which is adapted to hang a bicycle rear wheel and is connected to the second hanging position (11) of the vertical pole assembly (1), the at least one second hanging assembly (4) being rotatably attached to any radial position of the vertical pole assembly (1), and
   a foot assembly (6) connected to a lower end of the vertical pole assembly (1).

2. The vertical bicycle stand as claimed in claim 1, where the vertical pole assembly (1) comprises an upper tube (12), a middle tube (13), and a lower tube (14), the middle tube (13) has a connecting section (130) formed on each of two ends thereof, the upper tube (12) and the lower tube (14) are respectively connected to the two connecting sections (130), a length of the vertical pole assembly (1) is adjustable by being connected with the middle tube (13) of different lengths.

3. The vertical bicycle stand as claimed in claim 1, where the first part (22) is rotatable relative to the first link (21) and has a first curved portion (220), the first curved portion (220) is used to hang the bicycle front wheel.

4. The vertical bicycle stand as claimed in claim 3, where the first part (22) has an arc section (221) extending from an end opposite to the first link (21).

5. The vertical bicycle stand as claimed in claim 1, where the at least one second hanging assembly (4) includes a second plate (40), a second link (41) connected to the second plate (40), and a second part (42) connected to the second link (41), the vertical pole assembly (1) has a plurality of second connecting holes (16), the second plate (40) has a second connecting part (43), a second connector (5) is connected to the second connecting part (43) extending through the second connecting hole (16).

6. The vertical bicycle stand as claimed in claim 5, where the second part (42) is rotatable relative to the second link (41) and has a second curved portion, the second curved portion is used to hang the bicycle rear wheel.

7. The vertical bicycle stand as claimed in claim 1, where the foot assembly (6) includes a sleeve assembly (60) and a plurality of support rods (61) connected to an outer surface of the sleeve assembly (60), an angled area (62) is formed between any two adjacent support rods (61), the sleeve assembly (60) has a plurality of reinforcing parts (65) that are connected to the support rods (61), the sleeve assembly (60) has a passage (66) into which the vertical pole assembly (1) is inserted, an arrangement of the sleeve assembly (60), the support rods (61) and the reinforcing parts (65) stabilizes a standing position of the vertical pole assembly (1).

8. The vertical bicycle stand as claimed in claim 7, where the sleeve assembly (60) is consists of two arc-shaped pieces (63), the two arc-shaped pieces (63) have a plurality of third connecting holes (64), a plurality of third connectors (7) extend through the third connecting holes (64) of the two arc-shaped pieces (63) and are connected with nuts to secure the sleeve assembly (60).

* * * * *